United States Patent
Wilson, Jr. et al.

(10) Patent No.: US 7,257,550 B2
(45) Date of Patent: Aug. 14, 2007

(54) LEVERAGING INSTANT MESSAGING PRESENCE TO DRIVE SALES OPPORTUNITIES

(75) Inventors: Richard Alexander Wilson, Jr., Fallbrook, CA (US); James Justin DePoy, Corona del Mar, CA (US)

(73) Assignee: Canon Development Americas, Inc., Irvine, CA (US)

(*) Notice: Subject to any disclaimer, the term of this patent is extended or adjusted under 35 U.S.C. 154(b) by 414 days.

(21) Appl. No.: 10/816,681

(22) Filed: Apr. 2, 2004

(65) Prior Publication Data

US 2005/0222915 A1    Oct. 6, 2005

(51) Int. Cl.
*G06Q 30/00*    (2006.01)
(52) U.S. Cl. .................................................. 705/26
(58) Field of Classification Search ............... 705/26, 705/27; 709/205, 206, 207, 217, 218, 219
See application file for complete search history.

(56) References Cited

U.S. PATENT DOCUMENTS

| | | | |
|---|---|---|---|
| 6,529,692 B1 | 3/2003 | Haines et al. | |
| 6,629,134 B2* | 9/2003 | Hayward et al. | 709/217 |
| 6,798,997 B1* | 9/2004 | Hayward et al. | 399/12 |
| 2001/0003202 A1* | 6/2001 | Mache et al. | 713/153 |
| 2002/0140966 A1* | 10/2002 | Meade et al. | 358/1.15 |
| 2002/0143642 A1 | 10/2002 | Harper | |
| 2003/0139973 A1 | 7/2003 | Claremont et al. | |
| 2005/0102362 A1* | 5/2005 | Price et al. | 709/206 |
| 2005/0162685 A1* | 7/2005 | Heiles et al. | 358/1.15 |

FOREIGN PATENT DOCUMENTS

EP    1235168 A2 *    8/2002

OTHER PUBLICATIONS

DeMaria, M.J., "Rendevous on the LAN Side," Network Computing, p. 19, Aug. 5, 2002.*
AOL Instant Messenger (http://www.aim.com/) Nov. 2003.
Microsoft MSN Messenger (http://messenger.msn.com) Nov. 2003.
Yahoo Messenger (http://messenger.yahoo.com) Nov. 2003.
ICQ (http://www.icq.com/products/) Nov. 2003.
Instant Transaction Messaging (http://www.netrana.com) Nov. 2003.
Odigo (http://www.odigo.org/) Nov. 2003.
FaceTime (http://www.facetime.com/) Nov. 2003.
Gordano (http://www.ntmail.co.uk/) Nov. 2003.
Antepo (http://www.antepo.com/) Nov. 2003.
Bantu (http://corp.bantu.com/) Nov. 2003.
PresenceWorks (http://www.presenceworks.com/) Nov. 2003.
Ikimbo (http://www.ikimbo.com/products.asp) Nov. 2003.

* cited by examiner

*Primary Examiner*—Nicholas D. Rosen
(74) *Attorney, Agent, or Firm*—Canon U.S.A., Inc., IP Division

(57) ABSTRACT

A method and system for providing an application that uses real-time communication to order products and/or services. The method and system comprise launching a real-time chat application on a client device, logging into the real-time chat application, initiating a discovery operation of the client device upon logging in, displaying peripheral devices connected to the client device detected by the discovery operation, selecting a peripheral device from the detected peripheral devices, displaying products and/or services for the selected peripheral device, and obtaining products and service for the selected peripheral device.

24 Claims, 11 Drawing Sheets

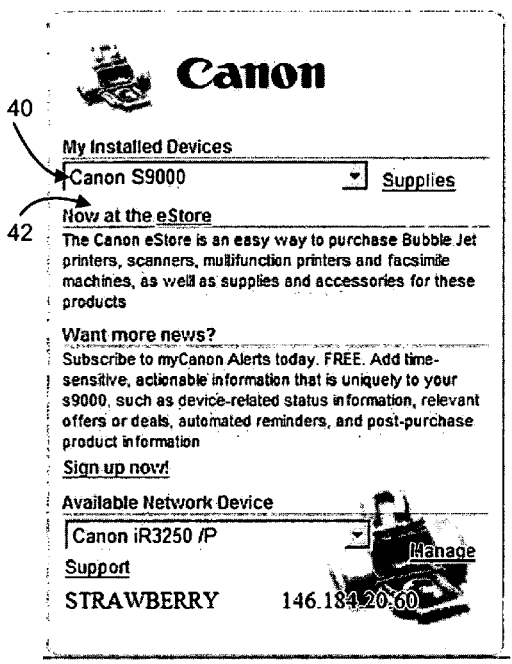
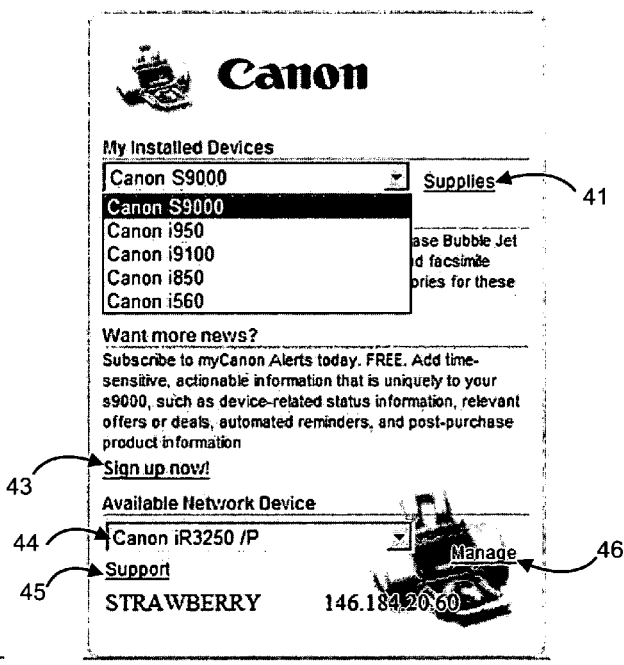
Fig 5a
Fig 5b

LEVERAGING INSTANT MESSAGING PRESENCE TO DRIVE SALES OPPORTUNITIES

BACKGROUND OF THE INVENTION

1. Field of the Invention

The present invention relates to systems and methods for obtaining products and/or services, more particularly, to a method and system for using real-time communication to obtain products and/or services.

2. Description of the Related Art

With the rising use of computer systems in the home or work environment, the use of peripheral devices has also increased. Due to the consistent use of these peripheral devices, there comes a time when the peripheral device needs to be serviced, or replacement of consumables (i.e., toners, ink cartridges, etc) is required. Typically, to replace consumables, a user will call a consumable supplier and place and order, or mail an order forms to a supplier, or travel to a local consumable supplier for the required consumable. More recently, consumers have been placing orders via the Internet on a consumable supplier's web site.

A typical scenario that occurs is where a user wants to print out a document, but discovers that the printing device is either low on or out of ink. To replenish the required ink, the user can perform on of the methods described above. One problem many users encounter when they go to order ink, is that they are faced with a number of different types of inks to choose from and they do not know which of these inks is best suited for their printing device. This problem is applicable for other consumables as well, such as paper.

With the advent of Internet shopping, a user can place an order online and have the consumable(s) shipped to a location of the user's choice. One of the drawbacks to this process is when the user first tries to choose the appropriate vendor for their product. There are many factors into choosing a supplier: cost of the consumables, whether the item is in stock, cost of shipping and handling, is the vendor well known where its products are named brands and not fakes. Once the user determines which online vendor to order from, the user usually has to navigate through a number of links/web pages to find the correct consumable for their peripheral device. The user typically needs to know the exact make and model of the device so there is no confusion as to which product to order. All of this can be very frustrating to a new user who has never experienced ordering from an online vendor.

The use of electronic mail (hereinafter referred to as "e-mail") notifications has made the process of Internet shopping a bit easier. In this process, a user receives e-mails notifying the user of a need to order a product for a peripheral device. The e-mail typically consists of hypertext links directing the user to a general products web page for the peripheral device. A disadvantage to this is that this process is not done in real-time, where there could be a delay in the e-mail notification, and the user is left without their needed product. In addition, the problem of being directed to a general web page and then having to navigate through a myriad of web pages to reach the one associated with the user's peripheral device is present in the e-mail notification process.

Although e-mail is currently one of the more popular ways of communicating, a significant number of people are beginning to use real-time chat applications to communicate. In a real-time chat environment, a user is able to, among other things, communicate with friends and/or coworkers in real-time, receive real-time up-to-date news, or receive notifications from a vendor's web site based on the user's predefined settings. For example, a user can set their favorite traveling location(s) on a particular travel related web site, and then when any travel specials or news related to one of the pre-defined locations occurs, the user receives notifications on the user's real-time chat program for that location from the travel related web site. It is features such as this that has helped increase the popularity of real-time chat.

Given the popularity of real-time environments, what is needed is a real-time process that will enhance the way of obtaining products or services that is not time consuming and is easy to use, where the appropriate product for the peripheral device can be obtained before it needs to be replenished/replaced.

SUMMARY OF THE INVENTION

The forgoing problems are addressed by a method and system for using real-time communication to obtain products and/or services. The present invention utilizes the presence element of a real-time chat connection combined with the monitoring of a local client device for connected peripheral devices to obtain products and/or services for the connected peripheral devices.

In one aspect of the present invention, a real-time chat application is launched on a client device. A user logins to the real-time chat application, wherein logging into the real-time chat application initiates a discovery operation on the client device. The discovery operation detects all the peripheral devices connected to the client device, and the user is provided with a display of the detected peripheral devices. A peripheral device is selected from the list of detected peripheral devices, and upon selection of the device, products and/or services associated with the selected peripheral device are displayed for the user. The user then obtains the required products and/or services for the selected peripheral device.

In yet another aspect, the real-time chat application obtains status information from the peripheral device. The real-time chat application then transmits the obtained status information to a remote server. The remote server generates real-time notifications based on the obtained status information, and transmits the notification(s) to the real-time chat application. In still yet another aspect, the real-time chat application uses the status information to automatically obtain products for the peripheral device.

In another aspect, the discovery operation detects devices connected to the client device via a network, and the user is provided with a display of the detected devices. A device is selected from the list of detected devices and upon selection of the device, products and/or services associated with the selected device are displayed for the user. The user then obtains the required products and/or services for the selected device.

The present invention makes it very convenient for a user to obtain products and/or services with use of real-time communication. This allows the user to minimize the time and effort taken by using a process of obtaining status information of a peripheral device to automatically obtain products and/or services for the device. A more complete understanding of the invention can be obtained by reference to the following detailed description of the preferred embodiment(s) thereof in connection with the attached drawings.

BRIEF DESCRIPTION OF THE DRAWINGS

FIGS. 5a and 5b depict an example of the user interface for the real-time chat application with detected peripheral device(s).

DETAILED DESCRIPTION OF THE INVENTION

The invention is described by way of a preferred embodiment, it is understood that the description is not intended to limit the invention to these embodiments, but is intended to cover alternatives, equivalents, and modifications such as are included within the scope of the appended claims.

Figure 1:
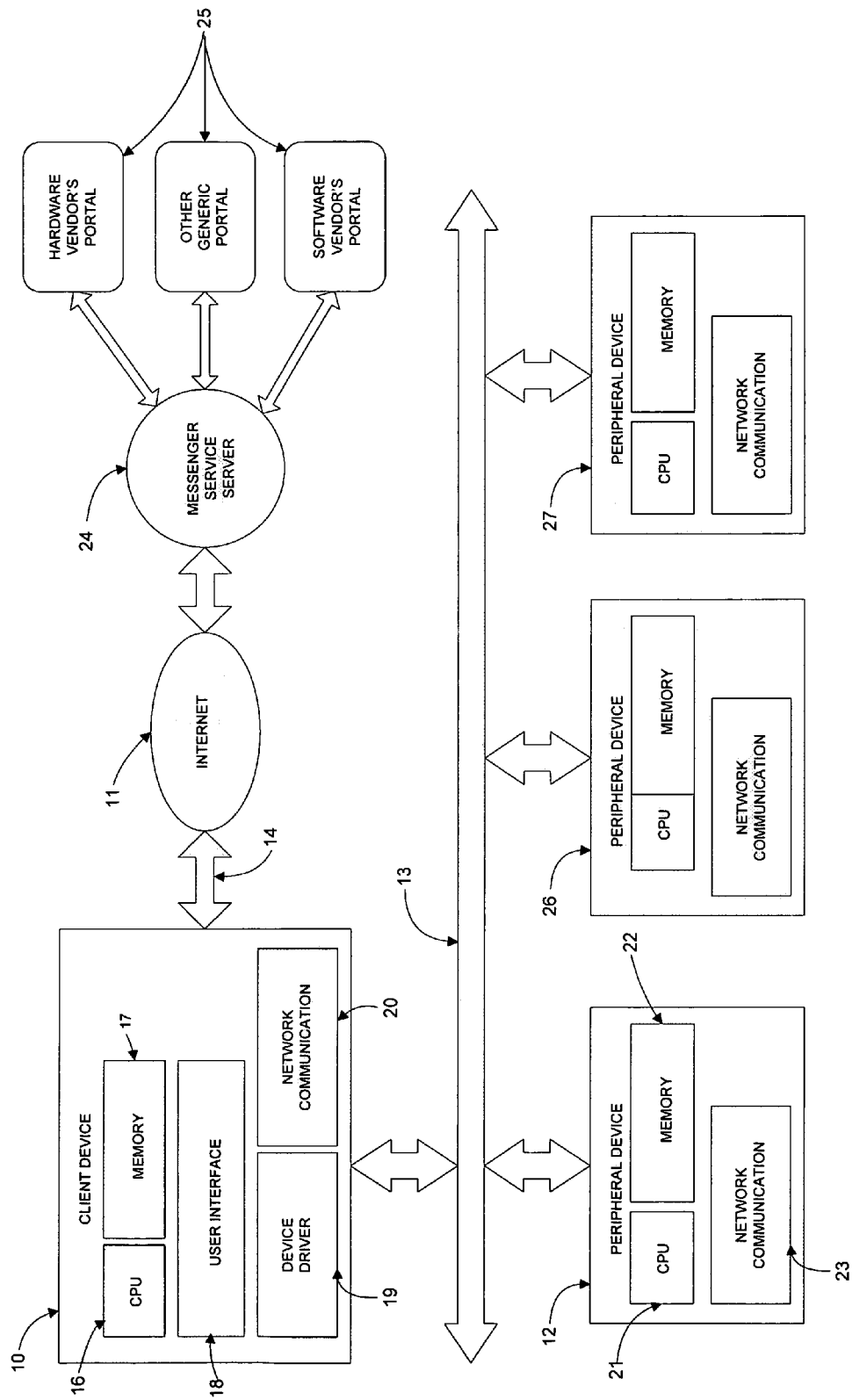
FIG. 1 is a representational view of the general configuration of the entire system.

FIG. 1 is a representational view of an entire system for using real-time communication to obtain products and/or services. Client device 10 is connected to one or more peripheral devices 12, 26, 27 via communication interface 13. Client device 10 is preferably a personal computer, however, any device that would enable practice of the present invention is applicable. Communication interface 13 is preferably a USB interface. While this embodiment is described using a USB architecture to provide interconnection between devices, it is to be understood that other types of bus architecture, such as IEEE 1394, maybe employed in practicing this invention. Peripheral devices 12, 26, 27 can be, but are not limited to, a printer, scanner, digital camera, video camcorder, personal digital assistant (PDA), or facsimile machine. Client device 10 is connected to the Internet 11 via communication path 14.

Client device 10 comprises a central processing unit (CPU) 16, memory 17, a display or graphical user interface 18, and device driver 19, which is used by client device 10 to communicate with peripheral devices 12, 26, 27. Network communication 20 is used to connect client device 10 to the Internet 11, as well as a variety of other different types of networks, such as wireless communications network system, an intranet, a LAN, or a WAN. Peripheral devices 12, 26, 27 comprise a central processing unit (CPU) 21, memory 22, and a network communication 23.

Messenger service server 24, which handles the functionality of the real-time chat application, is connected to client device 10 via the Internet 11. Internet portal vendors 25, such as software or hardware vendors that offer products and/or services to the user of peripheral devices 12, 26, 27 are connected to the messenger service server 24 via any standard communication mechanism (i.e., WAN).

Figure 2:
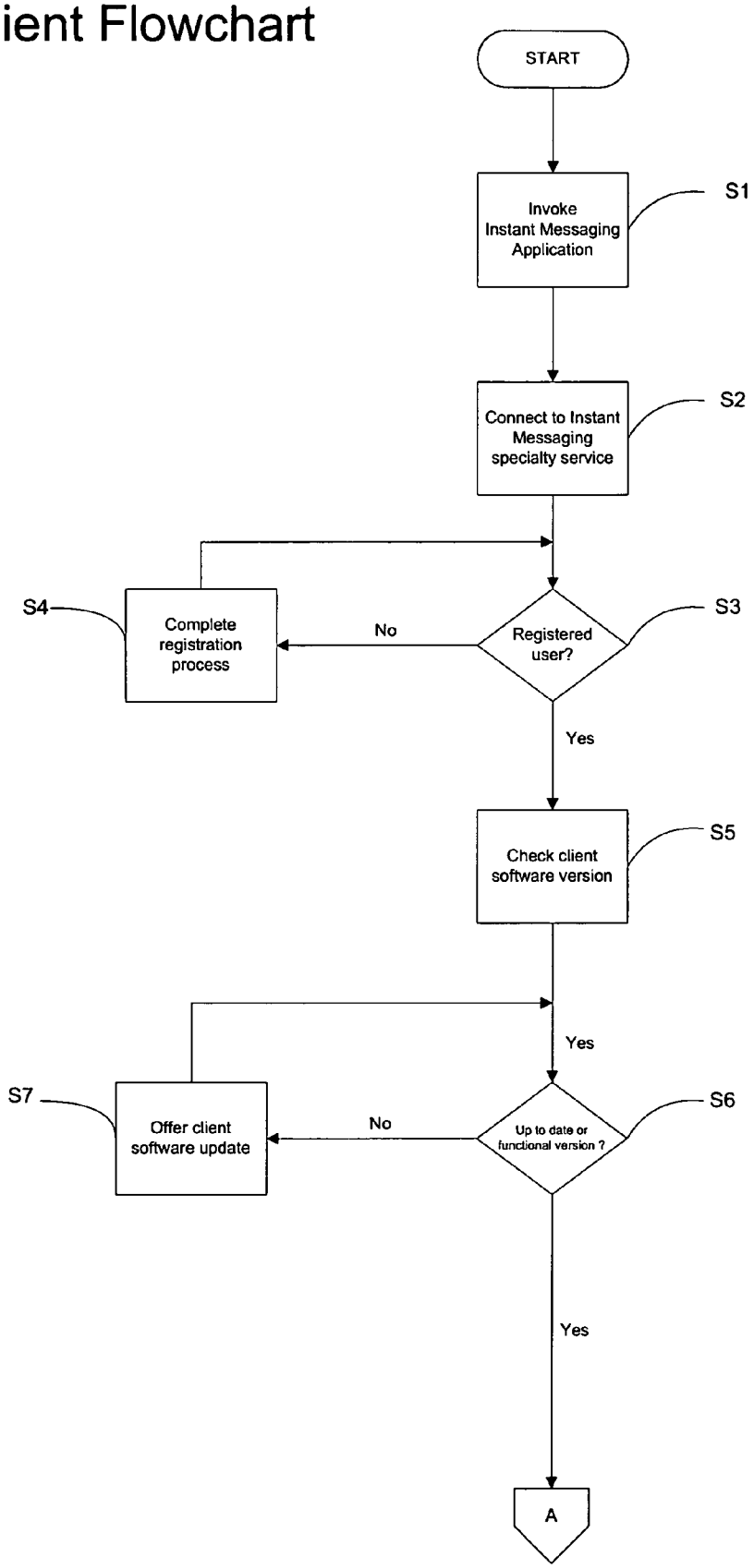
FIG. 2 is a flowchart describing the preferred embodiment of the real-time chat application of the present invention.
Figure 2:
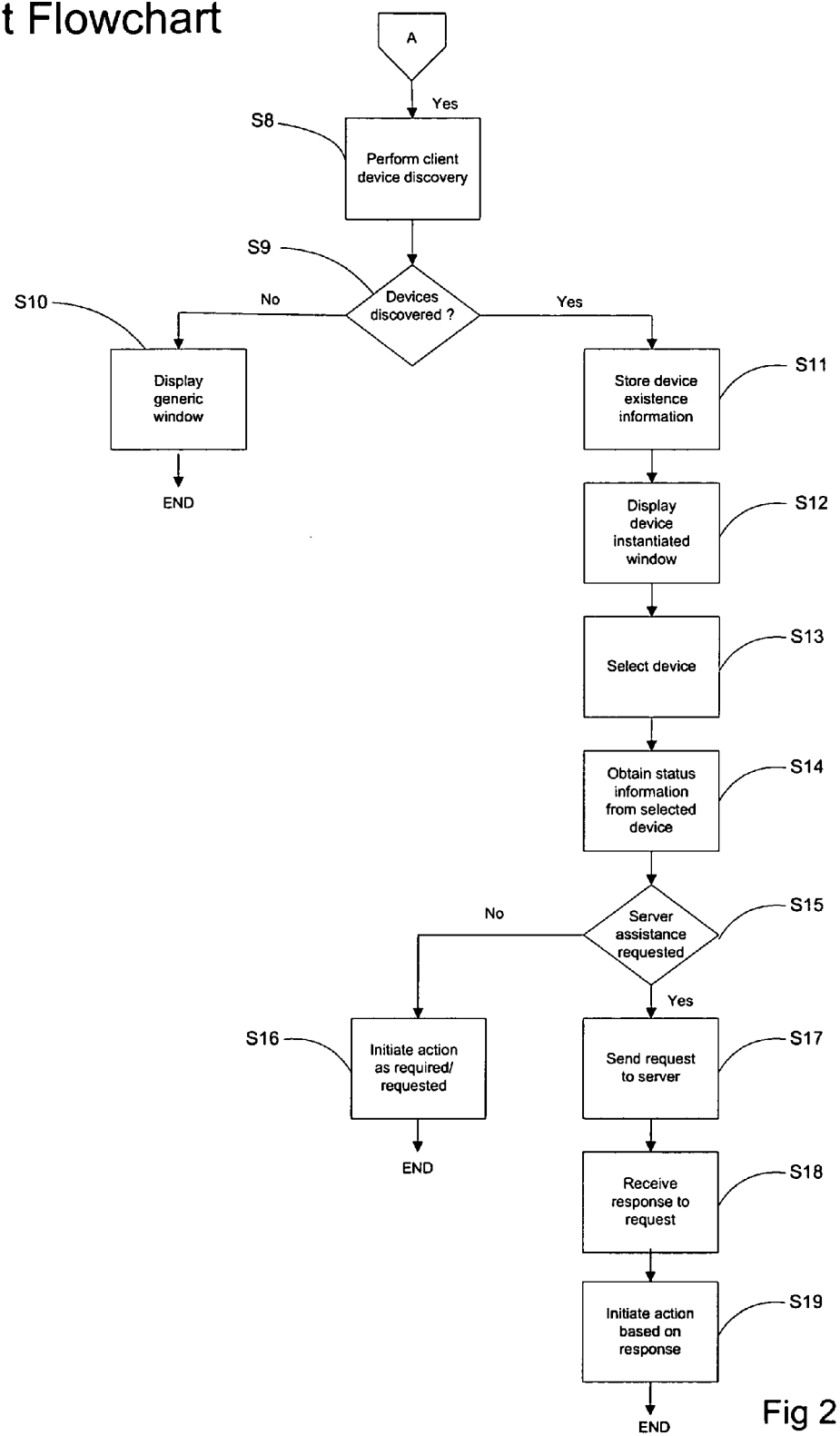

FIG. 2 is a flowchart describing the preferred embodiment of the real-time chat application of the present invention. Briefly, the steps include scanning the local client device for installed software and connected peripheral devices, where upon status information is provided for any detected peripheral device.

In more detail, in step S1, a real-time chat application is initiated on client device 10. Next, in step S2, the real-time chat application on client device 10 connects to messenger service server 24, where an add-on specialty service application, different from the real-time chat application, is offered. The add-on specialty service application provides a user with the ability to obtain products and/or services for peripheral devices connected to client device 10.

In step S3, a user logs onto the real-time chat application by inputting a login ID and password. If the user is not registered in the real-time chat application database, the process proceeds to step S4. Otherwise, if the user is a registered user, flow proceeds to step S5.

In step S4, the user is prompted to register with the real-time chat service. Once the registration process is completed, the user can logon to the real-time chat application and use the add-on specialty service application.

In step S5, the messenger service server 24 checks the client device 10 for the presence of the add-on specialty service application. Next, in step S6, the messenger service server 24 checks if the add-on specialty service application installed on client device 10 is the latest version. If the latest version of the application is installed, the process proceeds to step S8. If an older version is installed, the process proceeds to step S7, where the user is provided with an opportunity to install the latest version of the add-on specialty service application onto client device 10.

Turning to step S8, the real-time chat application performs a client device discovery operation, where it discovers external devices connected to the client device 10 and then stores the data associated with the discovered device(s).

Figure 6:
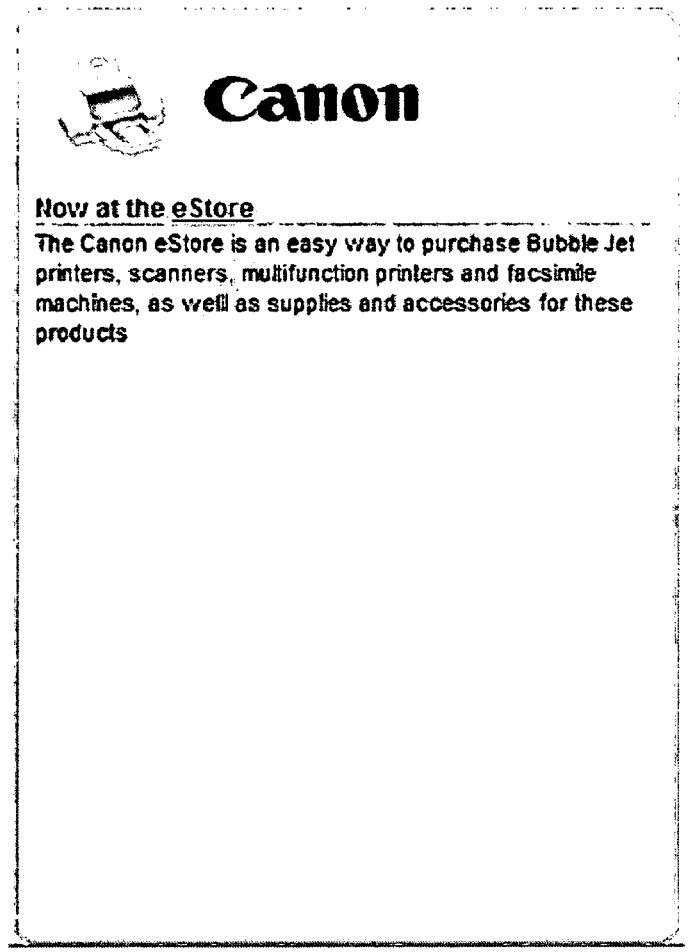
FIG. 6 depicts an example of the user interface for the real-time chat application.
Figure 8:
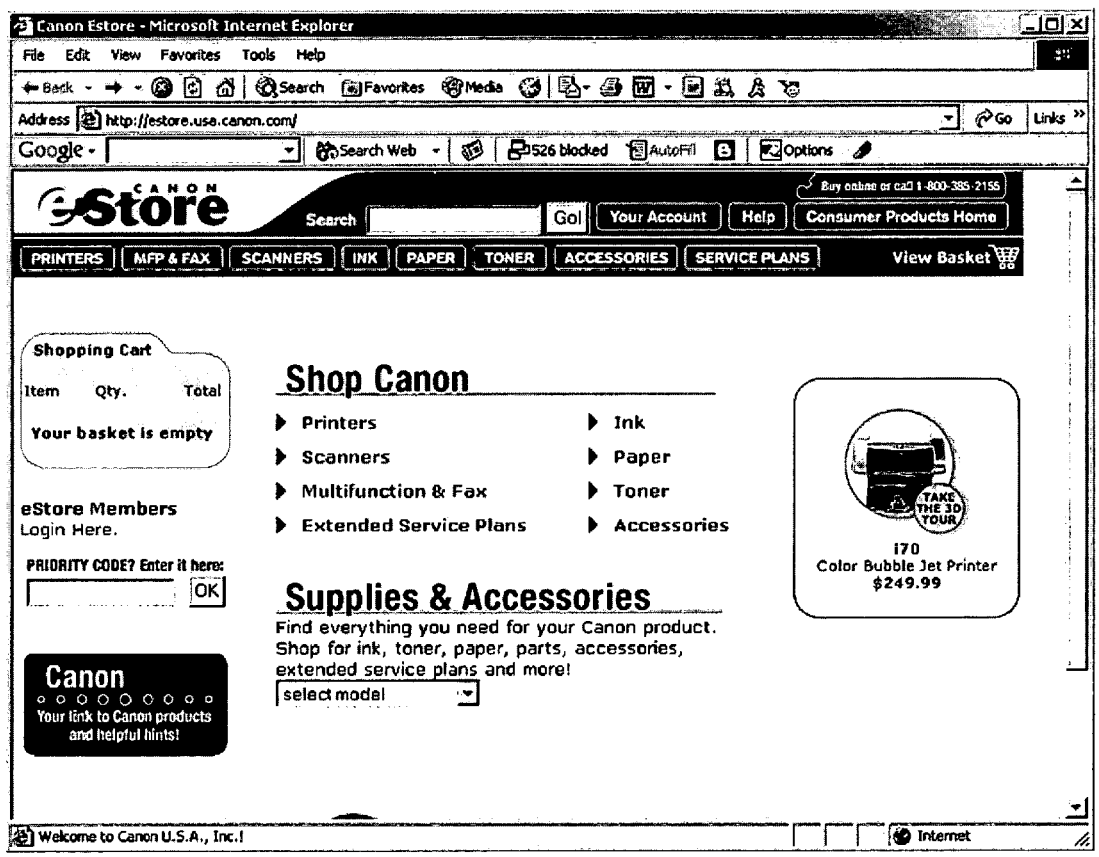
FIG. 8 depicts an example of a vendor's web page that displays products, accessories, and supplies.

Next, in step S9, a determination is made whether any devices were discovered in step S8. Flow proceeds to step S10 if no devices were discovered. In step S10, the real-time chat application displays a generic window with a hypertext link, as shown in FIG. 6, to a vendor's web page that displays among other things, products, supplies, and accessories offered by the vendor. FIG. 8 depicts an example of a vendor's web page that displays products, supplies, and accessories. Items are selected by navigating through various hypertext links and purchase of the selected items is performed through the use of an online shopping cart.

Returning to FIG. 2, if in step S9, any devices are discovered, then in step S11, the existence information associated with the detected peripheral device(s) is preferably stored on the client device 10. In another embodiment, the existence information is stored on messenger service server 24. And, in still yet another embodiment, the existence information is stored on both client device 10 and messenger service server 24.

In step S12, the real-time chat application displays a device instantiated window pertaining to the detected peripheral device(s) on the client device 10 as shown in FIG. 5a. "My Installed Devices" field 40 displays the peripheral device(s) detected in step S8 that are connected locally to client device 10. As shown in FIG. 5b, "My Installed Devices" field 40 is a drop-down menu that list all of the devices detected in step S8. When the user selects a particular peripheral device from the list or if only one peripheral device is detected in step S8, "My Installed Devices" field 40 appears as shown in FIG. 5*a*.

Figure 9:
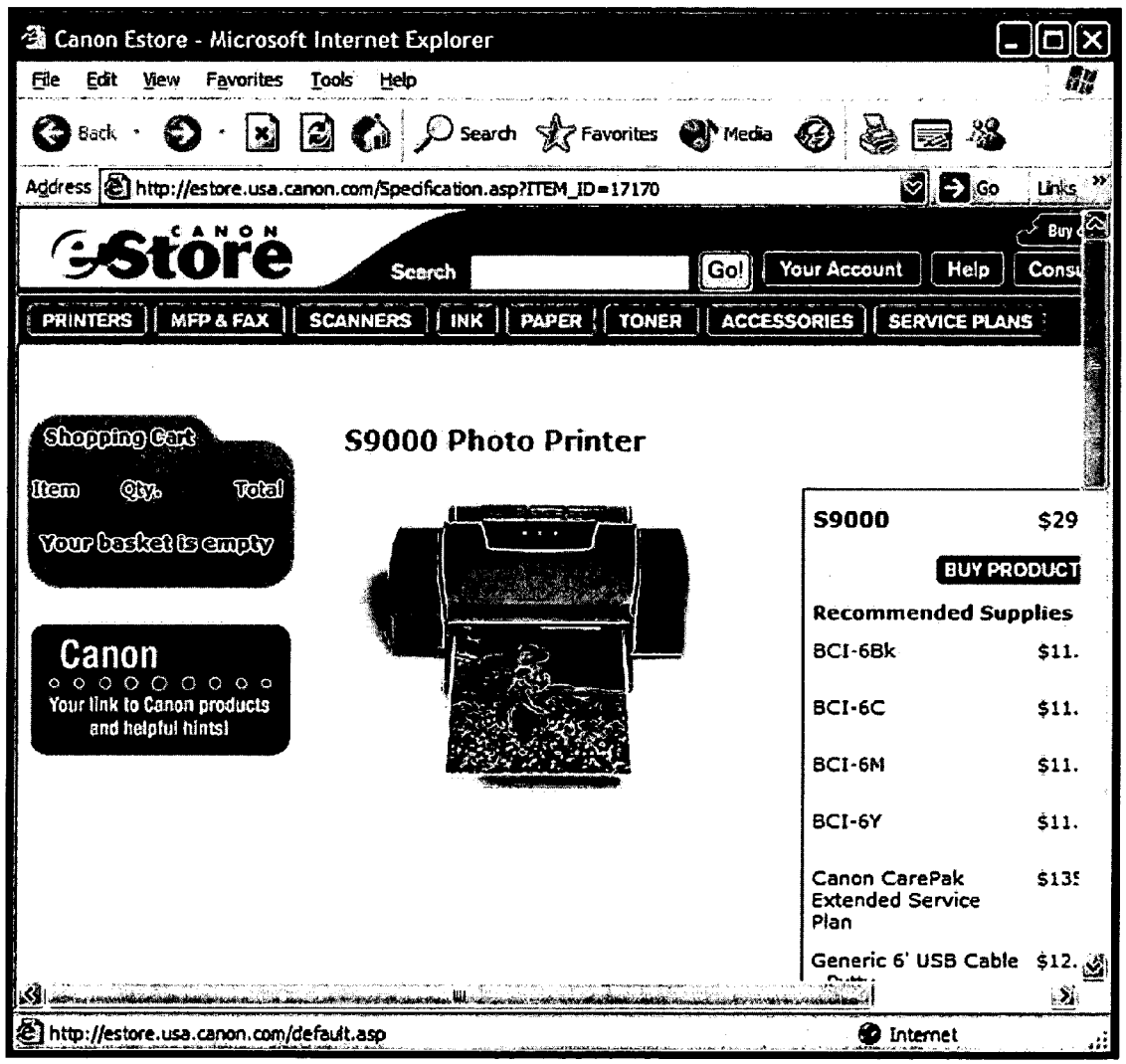
FIG. 9 depicts an example of a vendor's web page that displays products, accessories, and supplies for the selected peripheral device.

Hypertext link 41 provides access to a web page listing supplies associated with the peripheral device displayed in "My Installed Devices" field. FIG. 9 depicts an example of a web page displaying products and/or services for the peripheral device in the "My Installed Devices' field 40. A user can browse the web page depicted in FIG. 9 to find all the products relating to the peripheral device in the "My Installed Devices" field 40, such as, but not limited to, inks and toners. Hypertext link 42 provides the user with access to a web page for purchasing various products and equipment unrelated to the peripheral device that appears in the "My Installed Devices" field 40 (see FIG. 8). Hypertext link 43 provides the user with an opportunity to register for alerts or time-sensitive actionable information unique to the peripheral device displayed in the "My Installed Devices" field 40. These alerts include, but are not limited to, device-related status information, relevant offers or deals, automated reminders, and post purchase product information.

Figure 10:
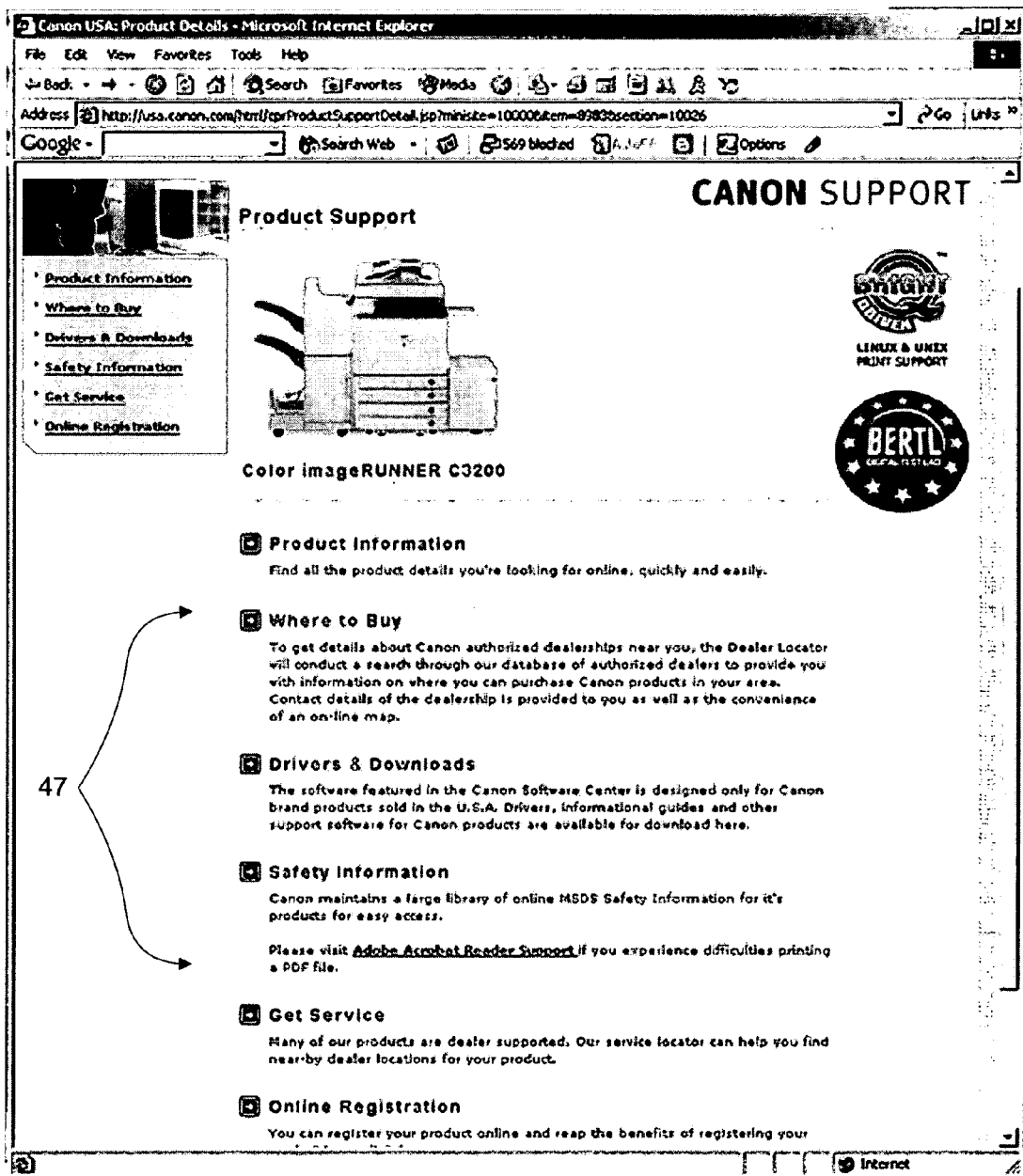
FIG. 10 depicts a web page that displays specific device support based on the selected peripheral device.
Figure 11:
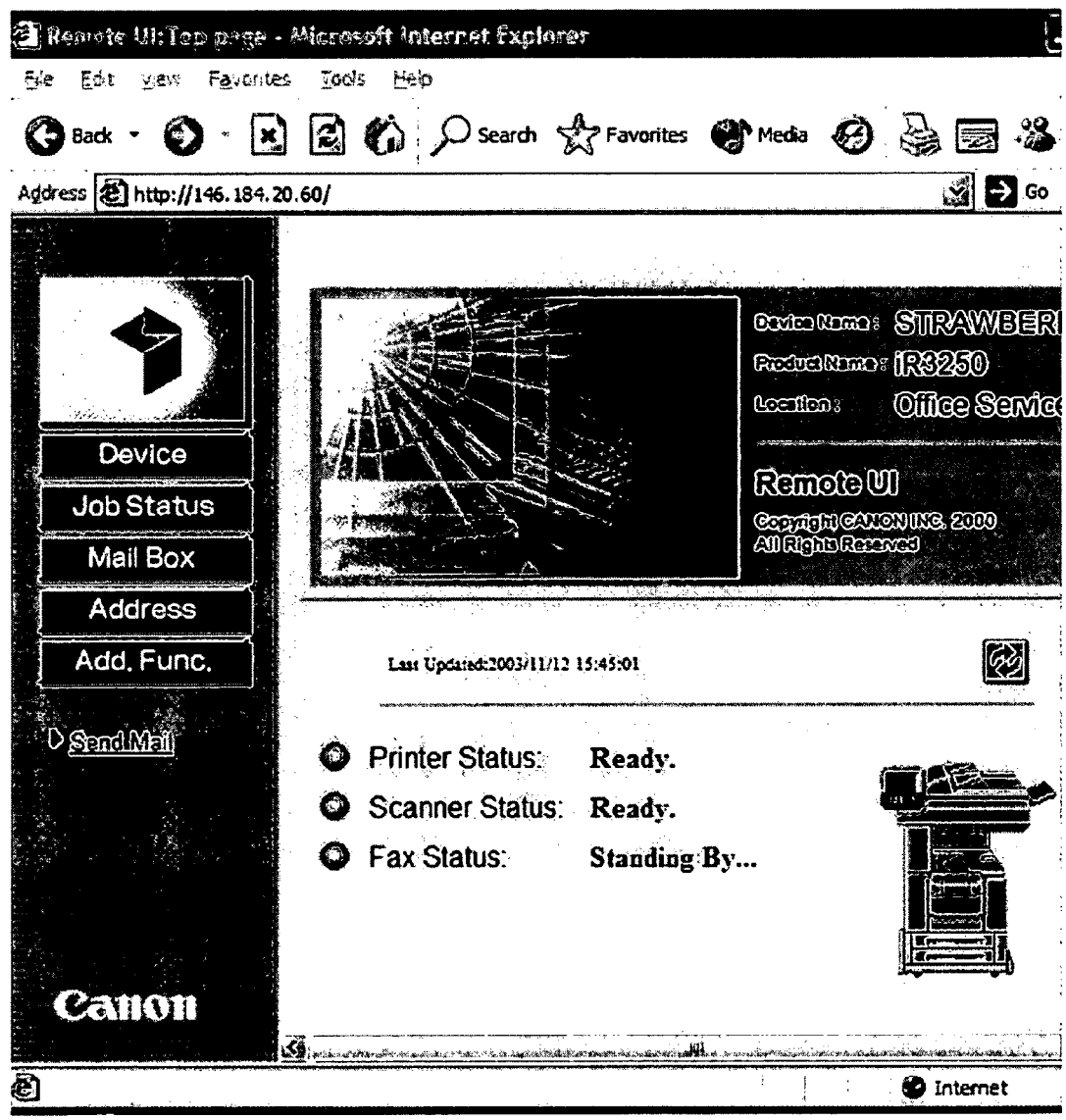
FIG. 11 depicts an example of the user interface for the remote manage feature for devices detected via a network.

"Available Network Device" field 44 is similar to "My Installed Devices" field 40, except that "Available Network Device" field 44 displays the peripheral device(s) detected in step S8 that are connected via a network to client device 10. Hypertext link 45 provides access to support information associated with the peripheral device displayed in "Available Network Device" field 44. FIG. 10 depicts a web page that displays specific device support for the peripheral device displayed in the "Available Network Device" field 44. The user is presented with a variety of support options 47, such as, but not limited to, product information, specific device drivers, ordering of service, or online registration. Finally, hypertext link 46 provides access to a web page that enables remote management of the peripheral device displayed in "Available Network Device" field 44. FIG. 11 depicts an example of the remote manage feature for the device displayed in the "Available Network Device" field 44. Among the management features available to a user are searching of specific device information, current job status, or mailbox functions.

Returning to FIG. 2, in step S13, the user selects a peripheral device displayed in the "My Installed Devices" field 40. As described above, if only one device is detected in step S8, then that device appears as the default device in "My Installed Devices" field 40 and is the only device available for the user to select. On the other hand, if more than one peripheral device was detected in step S8, then the user selects the desired device from the drop-down list.

In step S14, status information is gathered from the peripheral device selected in step S13. Next, in step S15, the real-time chat application determines, based on the status information obtained in step S14, whether assistance is required from messenger service server 24. For example, if a peripheral device were low on ink, notification of a low ink condition and the need to replenish the ink would be sent from the messenger service server 24 to the real-time chat application so that the real-time chat application displays the notice on client device 10. The process proceeds to step S17 in the case where assistance from messenger service server 24 is required. For example, in the scenario described above, real-time chat application would send a request to messenger service server 24 to generate a low ink state notice.

Figure 7:
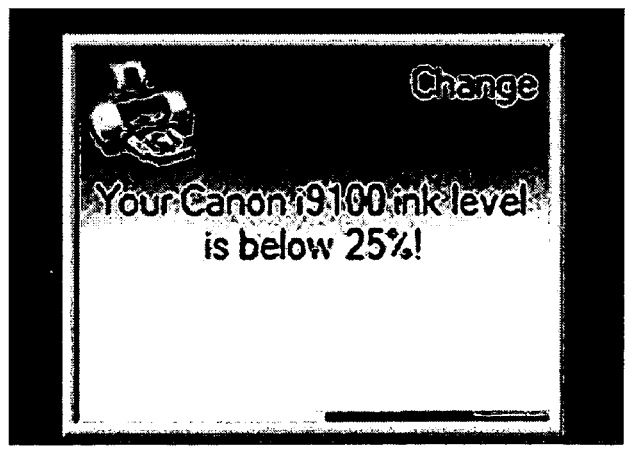
FIG. 7 depicts an example of the alert window.

In step S18, the real-time chat application receives a response to the request sent in step S17. Receipt of a response may result in creation of an alert window appearing on the user interface informing the user of an action that needs to be taken. FIG. 7 depicts an example of an alert window.

In step S19, an action is initiated based on the response received from the messenger service server 24 in step S18. The action taken can be done either manually by the user or automatically by the real-time chat application. For example, if the response provided in step S18 indicates that the selected peripheral device is low on ink, an alert window notifies the user of the low ink state. The user may either manually order ink from the a supply page specific to a peripheral device that is reached via a hypertext link provided in the alert window, or ordering of ink can be automatically performed upon receipt of an alert indicating the peripheral device is low on ink.

If, in step S15, assistance from the messenger service server 24 is not required, then flow proceeds to step S16 where the user initiates any action(s) on the real-time chat application as required or requested. For example, if the peripheral device encountered a paper jam condition, the real-time chat application would provide notification to the user via client device 10 of this condition without having to request that such notification be generated and provided by messenger service server 24. The user would correct the condition based on the notification. In addition, at this point, the user could obtain products and/or services for the selected peripheral device as the user so desired. Other actions that can be performed include setting any local preference associated with the selected peripheral device, such as reminder to order supplies after a set period of time has expired.

Figure 3:
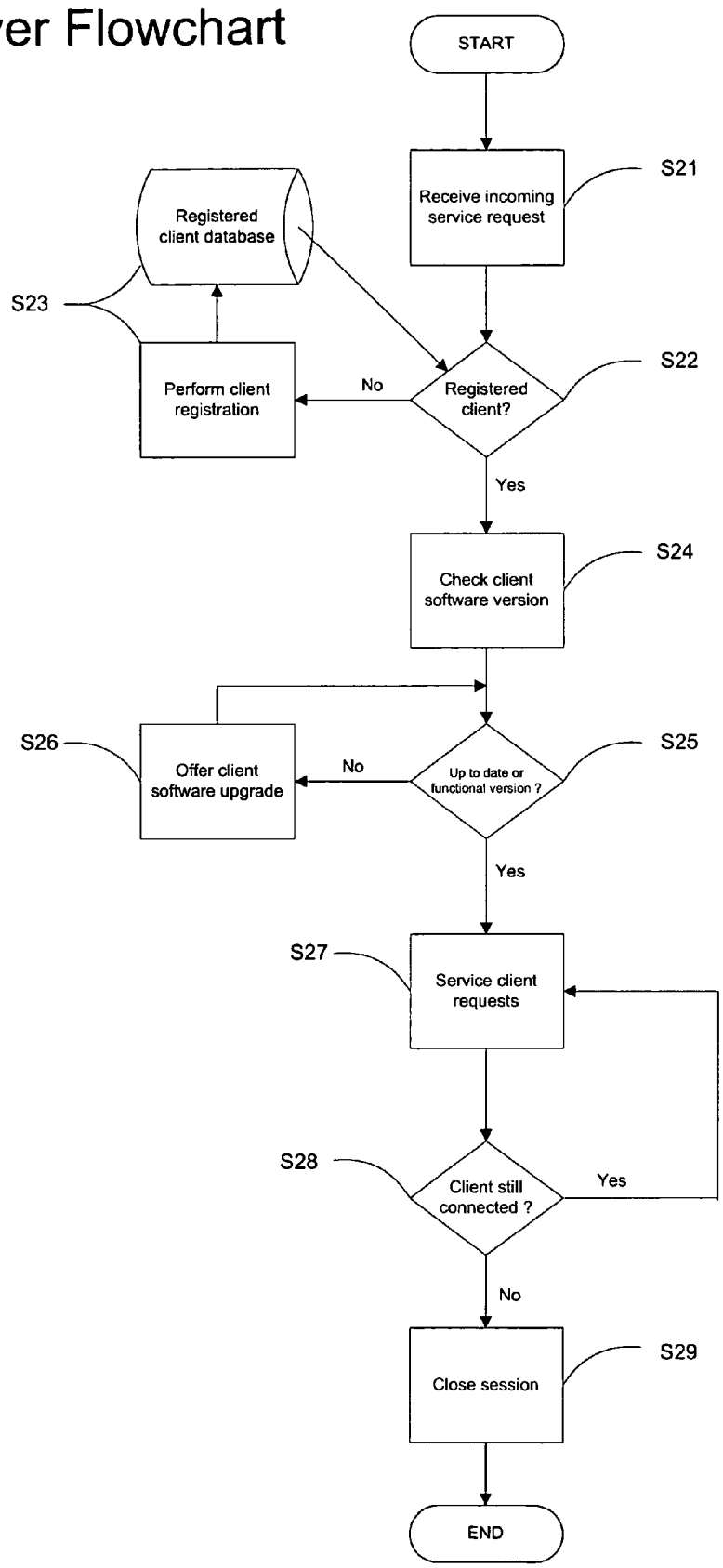
FIG. 3 is a flowchart describing the preferred embodiment of the server application of the present invention.

FIG. 3 is a flowchart describing the preferred embodiment of the messenger service server 24 application of the present invention. The steps involve handling access requests from the client device, performing software updates, and receiving service requests from the client device.

In more detail, in step S21, an access request containing user login credentials is received from the client device 10. The login credentials are inputted through the real-time chat application on the client device 10.

Next, in step S22, the messenger service server 24 verifies whether the received user login credentials are associated with a registered user. If the user is not registered, flow proceeds to step S23, where the user is prompted to provide registration information. Upon entering the information the user is added to the registration database.

If, in step S22, the user is registered, then in step S24, messenger service server 24 checks the add-on specialty service application currently installed on the client device 10. Next, in step S25, messenger service server 24 determines whether the software version of the add-on specialty service application on client device 10 is the most up-to-date version. If the version on client device 10 is not the latest, then in step S26, the user is provided with an opportunity to obtain the most current version.

If the version on client device 10 is the latest version, the flow proceeds to step S27, the messenger service server 24 waits a request from client device 10 to perform a particular service, such as issuing a notification as described above. Other services that messenger service server 24 performs include requesting a supply web page from one of the hardware or software vendor portals 25, where the request is for a peripheral device selected in "My Installed Device" field 40.

Upon completion of the requested service, flow proceeds to step S28, where messenger service server 24 determines whether client device 10 is still connected to messenger service server 24. If client device 10 is still connected, flow proceeds back to step S27, where messenger service server 24 waits for additional requests from client device 10. If client device 10 is not connected, then in step S29, messenger service server 24 ends the session with client device 10.

Figure 4:
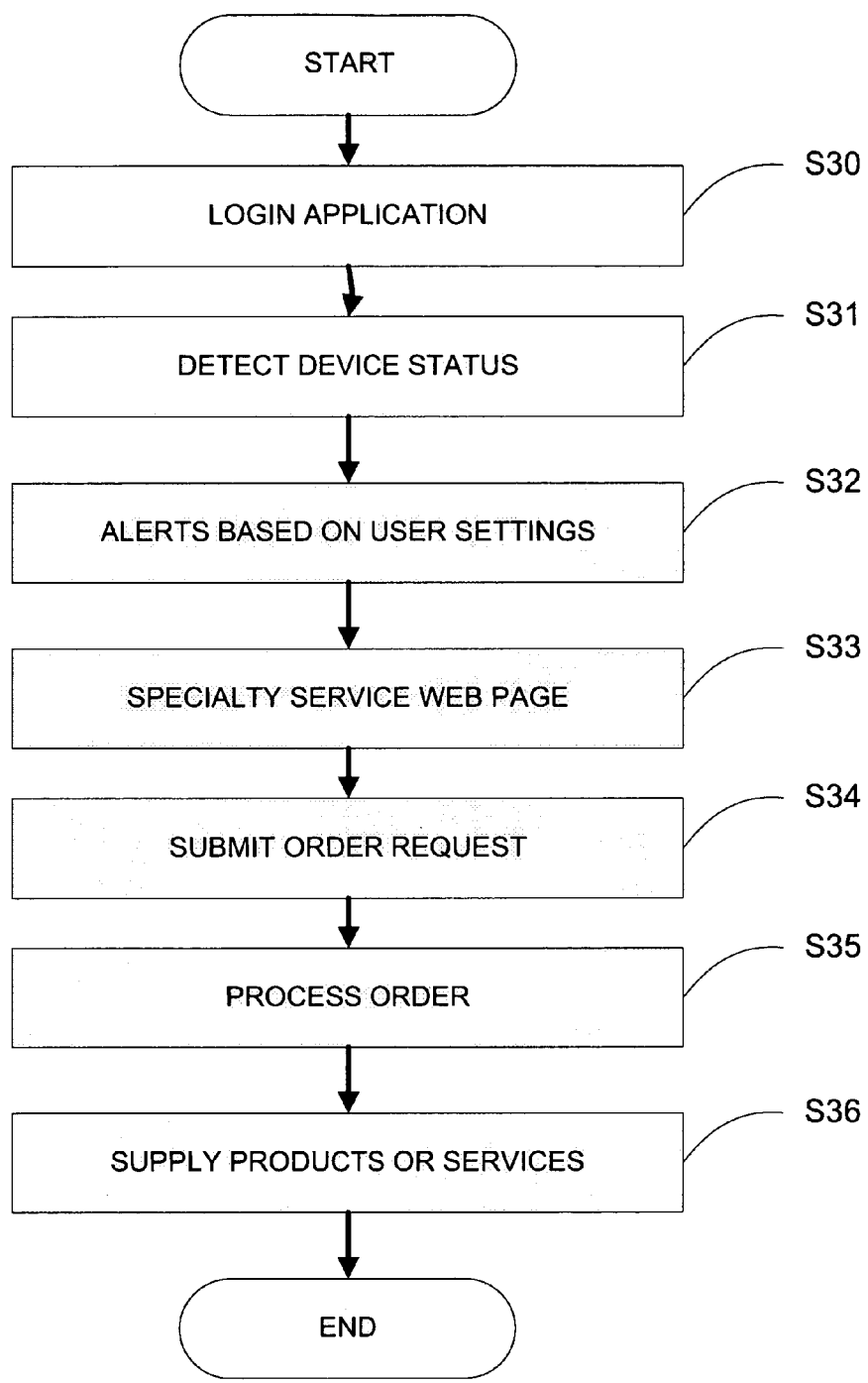
FIG. 4 is a flowchart describing the steps of ordering products and/or services in accordance with the present invention.

FIG. 4 is a flowchart describing the steps of using real-time communication to obtain products and/or services according to the present invention. Briefly, a user logs into a real-time chat application at client device 10, a discovery operation runs on the client device 10 to detect connected peripheral devices, and the user is provided an opportunity to order products, supplies, or services for the detected peripheral devices.

In more detail, in step S30 a real-time chat application is initiated on client device 10. As described above, a user inputs the user's login information, which is verified against a registered user database. After the user has been verified, the add-on specialty software application of the real-time chat application performs a discovery operation to detect any peripheral devices connected to client device 10. Status information associated with any detected peripheral device is retrieved and stored.

Next, in step S32, the real-time chat application displays alerts on client device 10. The alerts are based on the current status of the detected peripheral devices. For example, if a peripheral indicates it is in a low ink condition, an alert will be issued notifying the user of this condition. As part of the status notification, the user is provided an opportunity to obtain supplies that are relevant to the status notification (i.e., obtain ink for a low ink condition). In another embodiment, the supplies can be obtained automatically upon receipt of the notification without the need for user intervention.

In step S33, a user can be directed to an enhanced specialty service web page based on the settings of the real-time chat application. The user can obtain products or services pertaining to the currently selected device from the list on the real-time chat application (see FIG. 5). The user submits an order for any products or services in step S34.

Following submission of the order in step S34, in step S35, the order is received and processed by the Internet portal vendor(s) 25 with whom the order was placed. Next, in step S36, the ordered supplies and/or services are delivered to the user.

While the invention is described above with respect to what is currently its preferred embodiment, it is to be understood that the invention is not limited to that described above. To the contrary, the invention is intended to cover various modifications and equivalent arrangements within the spirit and scope of the appended claims.

What is claimed is:

1. A method for using real-time communication to obtain products and/or services, comprising:
    launching a real-time chat application on a client device;
    logging into the real-time chat application;
    wherein logging into the real-time chat application initiates a device discovery operation on the client device;
    displaying peripheral devices connected to the client device detected by the device discovery operation;
    selecting a peripheral device from the detected peripheral devices;
    displaying products and/or services for the selected peripheral device; and
    obtaining products and/or services for the selected peripheral device.

2. A method according to claim 1, wherein the products and/or services displayed for the selected peripheral device are provided to the client device by a remote server.

3. A method according to claim 1, wherein the products include consumables for the selected peripheral device.

4. A method according to claim 1, wherein the services include updates for software on the client device.

5. A method according to claim 1, wherein the real-time chat application obtains status information from the detected peripheral devices.

6. A method according to claim 5, wherein the real-time chat application transmits the obtained status information to a remote server.

7. A method according to claim 6, wherein real-time notifications based on the obtained status information are generated by the remote server and transmitted to the real-time chat application.

8. A method according to claim 5, wherein the real-time chat application automatically obtains products and/or services based on the status information.

9. A method according to claim 1, wherein the device discovery operation further comprises detecting peripheral devices connected to the client device via a network.

10. A method according to claim 9, further comprising selecting a peripheral device connected via a network.

11. A method according to claim 10, wherein products and/or services are obtained for the selected peripheral device.

12. A method according jo claim 10, wherein the selected peripheral device can be managed remotely.

13. A system for using real-time communication to obtain products and/or services, comprising:
    means for launching a real-time chat application on a client device;
    means for logging into the real-time chat application, wherein logging into the real-time chat application initiates a device discovery, operation on the client device;
    means for displaying peripheral devices connected to the client device detected by the device discovery operation;
    means for selecting a peripheral device from the detected peripheral devices;
    means for displaying products and/or services for the selected peripheral device; and
    means for obtaining products and/or services for the selected peripheral device.

14. A system according to claim 13, wherein the products and/or services displayed for the selected peripheral device are provided to the client device by a remote server.

15. A system according to claim 13, wherein the products include consumables for the selected peripheral device.

16. A system according to claim 13, wherein the services include updates for software on the client device.

17. A system according to claim 13, wherein the real-time chat application obtains status information from the detected peripheral devices.

18. A system according to claim 17, wherein the real-time chat application transmits the obtained status information to a remote server.

19. A system according to claim 18, wherein real-time notifications based on the obtained status information are generated by the remote server and transmitted to the real-time chat application.

20. A system according to claim 17, wherein the real-time chat application automatically obtains products and/or services based on the status information.

21. A system according to claim 13, wherein the device discovery operation further comprises detecting peripheral devices connected to the client device via a network.

22. A system according to claim 21, further comprising selecting a peripheral device connected to the client device via a network.

23. A system according to claim 22, wherein products and/or services are obtained for the selected peripheral device.

24. A system according to claim 22, wherein the selected peripheral device can be managed remotely.

* * * * *